(12) United States Patent
Kassimis et al.

(10) Patent No.: US 10,567,373 B2
(45) Date of Patent: *Feb. 18, 2020

(54) ESTABLISHING SECURITY OVER CONVERGED ETHERNET WITH TCP CREDENTIAL APPROPRIATION

(71) Applicant: International Business Machines Corporation, Armonk, NY (US)

(72) Inventors: Constantinos Kassimis, Cary, NC (US); Chris Meyer, Cary, NC (US); Linwood H. Overby, Jr., Raleigh, NC (US); Jerry Stevens, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,144

(22) Filed: Nov. 10, 2017

(65) Prior Publication Data
US 2018/0367527 A1 Dec. 20, 2018

Related U.S. Application Data

(63) Continuation of application No. 15/624,884, filed on Jun. 16, 2017.

(51) Int. Cl.
*H04L 29/06* (2006.01)
*G06F 3/06* (2006.01)
*H04L 29/08* (2006.01)

(52) U.S. Cl.
CPC ............ *H04L 63/083* (2013.01); *G06F 3/067* (2013.01); *G06F 3/0623* (2013.01);
(Continued)

(58) Field of Classification Search
CPC .......................... H04L 63/105; H04W 12/003
See application file for complete search history.

(56) References Cited

U.S. PATENT DOCUMENTS

| 7,234,063 B1 | 6/2007 | Baugher et al. |
| 9,100,371 B2 | 8/2015 | Bagepalli et al. |
(Continued)

OTHER PUBLICATIONS

Constantinos Kassimis et al., "Establishing Security Over Converged Ethernet With TCP Credential Appropriation", U.S. Appl. No. 15/624,884, filed Jun. 16, 2017.
(Continued)

*Primary Examiner* — Ponnoreay Pich
(74) *Attorney, Agent, or Firm* — Cantor Colburn LLP; Teddi Maranzano (57) ABSTRACT

A system for establishing a secure connection is described. The system includes a remote direct memory access over converged Ethernet (RoCE) adapter and host device. The host device includes a processor configured to establish a Transmission Control Protocol (TCP) connection between the host device and a client device via the host device network adapter. The host device forwards Internet Protocol Security (IPSec) Security Associations (SAs) and related keys to a host device Remote Direct Memory Access over Converged Ethernet (RoCE) adapter operatively connected with the host device for remote direct memory access. The RoCE adapter communicates protected data to and from the client device over an RoCE connection using the IPSec SAs and related keys.

10 Claims, 6 Drawing Sheets

(52) U.S. Cl.
CPC ........ *G06F 3/0659* (2013.01); *H04L 63/0428* (2013.01); *H04L 63/166* (2013.01); *H04L 67/141* (2013.01); *H04L 69/16* (2013.01)

(56) References Cited

U.S. PATENT DOCUMENTS

| | | | |
|---|---|---|---|
| 9,178,966 B2 | 11/2015 | Fox et al. | |
| 9,306,916 B2 | 4/2016 | Snyder, II | |
| 9,749,175 B2 * | 8/2017 | Kuriakose | H04L 29/08576 |
| 2011/0191481 A1 * | 8/2011 | Swany | H04L 47/724 |
| | | | 709/227 |
| 2013/0080562 A1 * | 3/2013 | Fox | H04L 69/08 |
| | | | 709/212 |
| 2013/0332678 A1 * | 12/2013 | Fitzpatrick | G06F 12/00 |
| | | | 711/147 |
| 2014/0297775 A1 * | 10/2014 | Davda | G06F 13/28 |
| | | | 709/212 |
| 2015/0039712 A1 * | 2/2015 | Frank | H04L 67/40 |
| | | | 709/212 |
| 2015/0178242 A1 * | 6/2015 | Snyder, II | H04L 63/0428 |
| | | | 713/150 |
| 2016/0057121 A1 | 2/2016 | Metsala et al. | |
| 2016/0248628 A1 * | 8/2016 | Pandit | H04L 41/0806 |
| 2016/0337272 A1 | 11/2016 | Berman | |
| 2016/0342547 A1 * | 11/2016 | Liss | G06F 13/385 |
| 2017/0155717 A1 * | 6/2017 | Tamir | H04L 45/745 |

OTHER PUBLICATIONS

List of IBM Patents or Patent Applications Treated as Related; (Appendix P), Filed Nov. 10, 2017; 2 pages.

\* cited by examiner

ESTABLISHING SECURITY OVER CONVERGED ETHERNET WITH TCP CREDENTIAL APPROPRIATION

DOMESTIC PRIORITY

This application is a continuation of and claims priority from U.S. patent application Ser. No. 15/624,884, filed on Jun. 16, 2017, entitled "ESTABLISHING SECURITY OVER CONVERGED ETHERNET WITH TCP CREDENTIAL APPROPRIATION," the content of which are incorporated herein by reference in its entirety.

BACKGROUND

The present disclosure relates to internet communication security, and more specifically, to establishing security over converged Ethernet by appropriating Internet Protocol Security (IPSec) Security Association (SA) credentials.

Many industries require Internet Protocol Security (IPSec) for any internet protocol (IP) network traffic that must flow over unique IP subnets (e.g., security zones). Consequently, many platforms create infrastructure to support IPSec and build in separate security features to administrate their own security ecosystem. For example, some platforms are configured to satisfy IPSec security requirements for interfacing with different IP endpoints. These same users may extend their existing management and security capabilities (IPSec policies, SAs, and administrative controls) to Remote Direct Memory Access over Converged Ethernet (RoCE) connections to the same endpoints that are associated with existing Transmission Control Protocol (TCP) connections. They do this by defining separate IPSec policies for the RoCE connections. Establishing separate security credentials for the RoCE connections can consume processing time and resources for the new connection, in addition to requiring additional security and administrative configuration. From another viewpoint, establishing a blanket security policy that encrypts all RoCE connections may over-protect data streams that do not require security. By performing IPSec where it is not required by policy or at a cryptographic strength higher than what is required by policy, valuable resources may be wasted.

SUMMARY

According to an embodiment of the present invention, a computer-implemented method for establishing a secure connection is described. The method includes establishing a Transmission Control Protocol (TCP) connection between a host device and a client device via a host device network adapter. The host device forwards Internet Protocol Security (IPSec) Security Associations (SAs) and related keys to a host device Remote Direct Memory Access over Converged Ethernet (RoCE) adapter on the host device for remote direct memory access. The RoCE adapter on the host device communicates protected data via the RoCE adapter operatively connected with the host device to and from the client device over the RoCE connection using the IPSec SAs and related keys.

According to other embodiments, a system for establishing a secure connection is described. The system includes a remote direct memory access over converged Ethernet (RoCE) adapter and host device. The host device includes a processor configured to establish a Transmission Control Protocol (TCP) connection between the host device and a client device via the host device network adapter. The host device forwards Internet Protocol Security (IPSec) Security Associations (SAs) and related keys to a host device Remote Direct Memory Access over Converged Ethernet (RoCE) adapter operatively connected with the host device for remote direct memory access. The RoCE adapter communicates protected data to and from the client device over a RoCE connection using the IPSec SAs and related keys.

According to another embodiment of the present invention, a computer program product is also described. The computer program product includes a computer-readable storage medium that has program instructions saved upon it that are executable by a processor to cause a computer to perform a method for establishing a secure connection over transmission control protocol (TCP). The program instructions perform a method that includes establishing a Transmission Control Protocol (TCP) connection between a host device and a client device via a host device network adapter. The host device forwards Internet Protocol Security (IPSec) Security Associations (SAs) and related keys to a host device Remote Direct Memory Access over Converged Ethernet (RoCE) adapter on the host device for remote direct memory access. The RoCE adapter operatively connected with the host device communicates protected data via the RoCE adapter on the host device to and from the client device over the RoCE connection using the IPSec SAs and related keys.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Several technologies used in embodiments of the invention are first considered in the following paragraphs. Next, a general overview of one or more embodiments is given. Finally, detailed descriptions of each of the claimed embodiments are described.

As used herein, Internet Protocol Security (IPSec) describes a protocol suite for secure Internet Protocol (IP) communications. IPSec uses cryptographic security services to protect communications over IP networks. IPSec supports network-level peer authentication, data-origin authentication, data integrity, data confidentiality (encryption), and replay protection. In general, IPSec works by authenticating and encrypting each IP packet of a communication session between connection peers (also referred to as agents or hosts). An Internet Key Exchange (IKE) protocol includes protocols for establishing mutual authentication between agents at the beginning of the session and negotiation of cryptographic keys for use during the session. IPSec can protect data flows between a pair of hosts (host-to-host), between a pair of security gateways (network-to-network), or between a security gateway and a host (network-to-host). Most IPSec implementations consist of an IKE daemon that runs in user space and an IPSec stack in the kernel that processes the actual internet protocol (IP) packets.

Remote direct memory access (RDMA) is an InfiniBand Trade Association (IBTA) standard that enables remote direct memory access over a network. RDMA is available on standard Ethernet-based networks by using the RDMA over Converged Ethernet (RoCE). RoCE enables the use of both standard TCP/IP and RDMA solutions such as Shared Memory Communications over RDMA (SMC-R) over the same physical local area network (LAN) fabric.

Shared memory communications (SMC) over remote direct memory access (SMC-R) is a protocol solution that allows sockets over RDMA. SMC-R enables TCP sockets applications to transparently use RDMA, which enables direct, high-speed, low-latency, memory-to-memory (peer-to-peer) communications. The TCP/IP stacks on communicating peers dynamically learn about the shared memory capability by using traditional TCP/IP connection establishment flows, enabling the TCP/IP stacks to switch from TCP network flows to optimize direct memory access flows that use RDMA. Using RDMA reduces networking stack overhead by using streamlined, low-level RDMA interfaces that are separate from the standard network adapter. RDMA is generally supported with a "lossless" network fabric such as a LAN for layer 2 data, and an RDMA-capable network interface card (NIC) and R-capable switch connecting the hosts.

All of the IPSec policy is stored and managed on the host. It is up to the host's IPSec component in the TCP/IP stack to forward any policy rules, SAs, keys, etc. to the RoCE adapter. Since it is not known in advance which RoCE link will be used for a given session, it can be difficult for a security administrator to write an IPSec policy that is appropriate to the traffic that may be carried over that link. In most cases all of the policy is written for the TCP traffic only. That policy is then inherited by the associated SMC-R connections as part of the association with a given TCP connection. It should be noted that the security used for IPSec links operating with RoCE protocols should be at least as strong as that required by the IPSec policy written for the TCP/IP connection for the initial TCP endpoints. If the protocols are not at least as secure as the IPSec policy for TCP/IP, then some sensitive traffic may be at risk while other traffic routed across the connection is not. Thus, having an under-protected blanket policy is not advantageous.

Although a blanket policy specifying the highest available cryptography for traffic could be efficient from an administrative perspective, it may not be advantageous to "over-protect" traffic by performing IPSec where it is not required by policy. For example, in some instances, not all traffic flowing across a data stream is sensitive and necessitates encryption. Even when not the highest available cryptographic protocol, it may be disadvantageous to set cryptographic strength higher than what is required by the policy because it can waste resources like memory allocation, bandwidth, processing time, etc.

Figure 1:
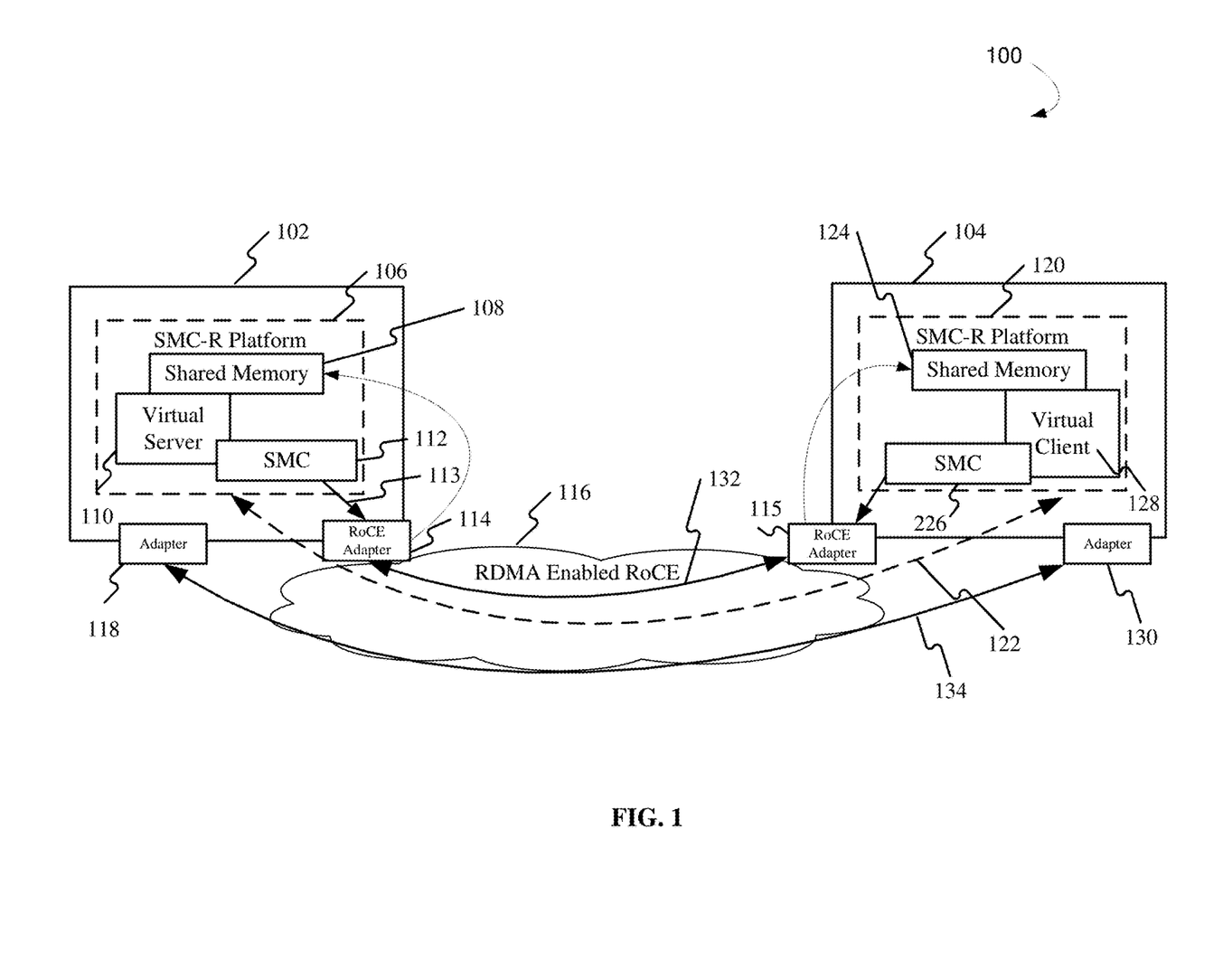
FIG. 1 depicts a system for establishing a secure connection according to one embodiment of the present invention.

Now, by way of a general overview of one or more embodiments, a system for establishing a secure connection is depicted in FIG. 1. System 100 includes two operatively connected devices (host device 102 and client device 104) that logically share shared memory 108 and 124 using RoCE network 116. System 100 includes an SMC-R enabled platform 106 running on host device 102 (hereafter "host SMC-R 106") and an SMC-R platform 120 (hereafter "client SMC-R 120") running on client device 104. Host SMC-R 106 includes shared memory 108 and a virtual server 110 running a shared memory communications (SMC) protocol 112. Similarly, client device 104 includes shared memory 124 and a virtual client server 128 running a SMC protocol 226.

Host device 102 also includes a RoCE adapter 114. As explained in greater detail in FIG. 2, RoCE adapter 114 is separate, either physically, logically, or both, from a network interface adapter 118 installed on host device 102. Client device 104 includes a RoCE network interface adapter 115 separate from a network interface adapter 130. In some embodiments, the network interface adapter 115 is logically separate from network interface adapter 130 but physically embodied as a single device. In other embodiments the adapters may be physically separate devices. Adapters 118 and 130 perform a TCP handshake to establish a TCP connection 134 between host device 102 and client device 104. During this handshake, information is exchanged to indicate support for SMC-R. If both devices support SMC-R, then additional messages are exchanged, first over the TCP connection 134, and then, if necessary, over the RoCE adapters 114 and 115, to create an SMC-R connection 132. If IPSec security associations are installed in the host to protect TCP connection 134, each device forwards its respective IPSec SAs and related keys to its respective RoCE adapter so that the IPSec logic in the adapters can use the IPSec SAs to protect the data that flows over SMC-R connection 132. Once SMC-R connection 132 is established and the IPSec SAs are installed, RoCE adapter 114 communicates protected RoCE communications across RDMA enabled SMC-R connection 132. Host device 102 and client device 104 include one or more processors (for example, processor 601 as shown in exemplary computer 600 shown in FIG. 6) that have awareness and control over the IP addresses used by the RoCE adapters 114 and 115 for RoCE traffic.

According to one embodiment, SMC-R enables virtual servers 110 and 128 that support RDMA enabled RoCE to logically share memory 108 and 124 over the RDMA enabled RoCE network 116. When a server (e.g., virtual server 110) that supports RDMA enabled RoCE detects that a remote TCP connection partner (e.g., virtual client 128) supports shared memory communications, the TCP connection 134 is transparently and dynamically switched by a processor in host device 102 from TCP/IP to use SMC-R protocols via a RoCE adapter 115. The applications running on virtual server 110 are unaware of the use of shared memory 108 for communications. For example, SMC-R uses TCP socket applications to transparently exploit RDMA.

Figure 2:
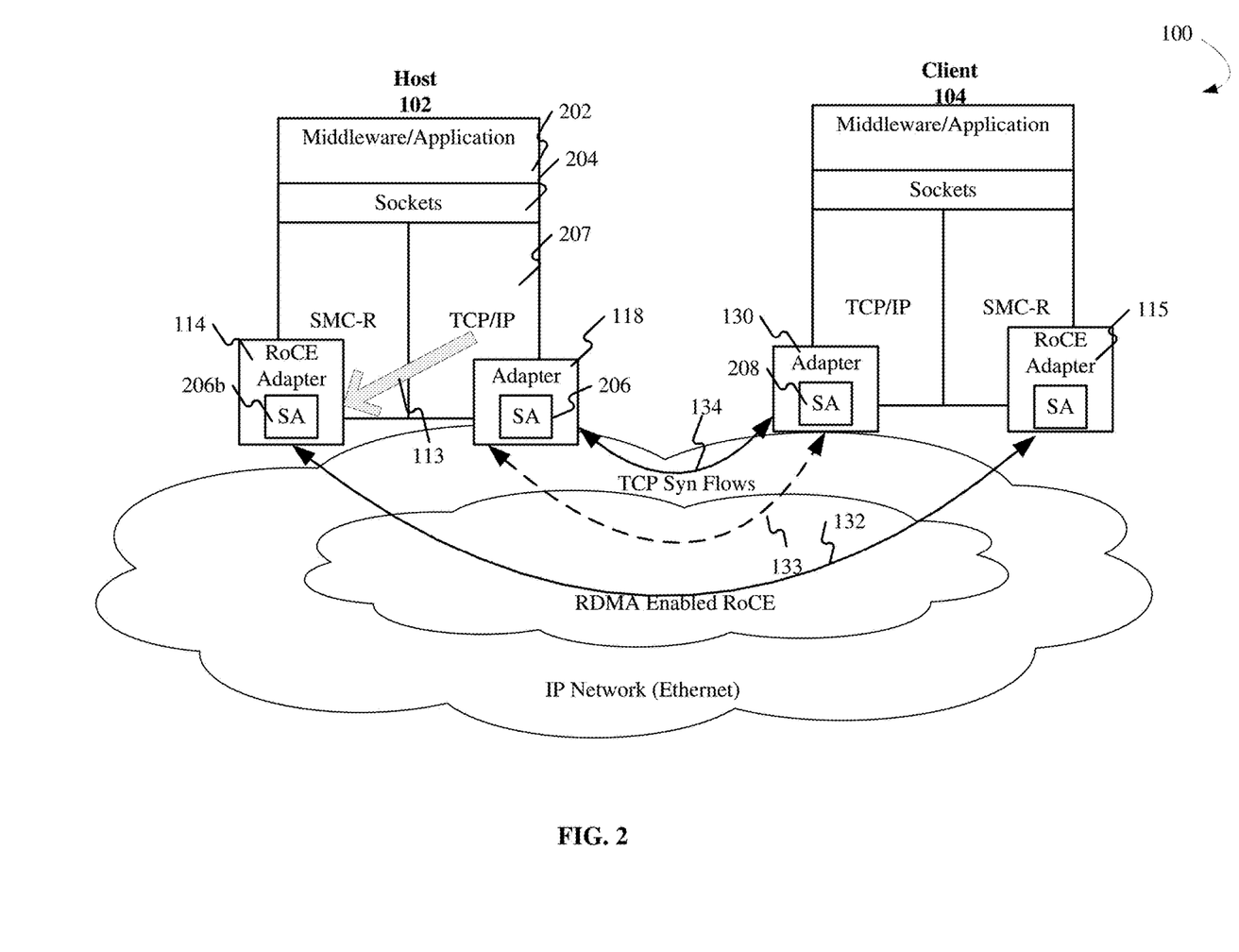
FIG. 2 illustrates an aspect of the system of FIG. 1 according to one embodiment of the present invention.

FIG. 2 shows another aspect of system 100, depicting the middleware layer 202 and socket layer 204 for communication between connected devices 102 and 104. Referring now to FIG. 2, once a set of SAs 206 and 208 are negotiated by the server-side Internet Key Exchange (IKE) server process (e.g., those running on host device 102), processor 601 pushes the resulting security association(s) (SA) and related keys (collectively 113) into the RoCE adapter 114 for runtime use by the adapter's IPSec process. In the present description, it is assumed that the negotiation of IPSec security associations will be performed by the IKE protocol that is running on the host device 102 rather than the RoCE adapter 114 itself.

The RDMA attribute information is exchanged within the TCP sync flows on TCP connection 134, and the socket application data is exchanged between the connected hosts (e.g., host device 102 and client device 104) via SMC-R connection 132 operating over RDMA enabled RoCE network 116. The TCP connection 134 remains active during the socket application data exchange and controls the SMC-R connection 122, but all data flows over the RoCE connection 132. This model preserves many critical existing operational and network management features of TCP/IP.

Processor 601 also pushes IP filter rules with the source and destination address of the RoCE link endpoints down to the RoCE adapter 114. In some aspects, these filter rules are used by the adapter IPSec process to locate the correct security associations for outbound processing and to verify that the correct security associations were used for inbound processing. According to one embodiment, where the solution requires multiple SAs, processor 601 creates multiple IP addresses, each associated with a unique RoCE reliably connected queue pair, between processor 601 and another device (e.g., client device 104).

Figure 3:
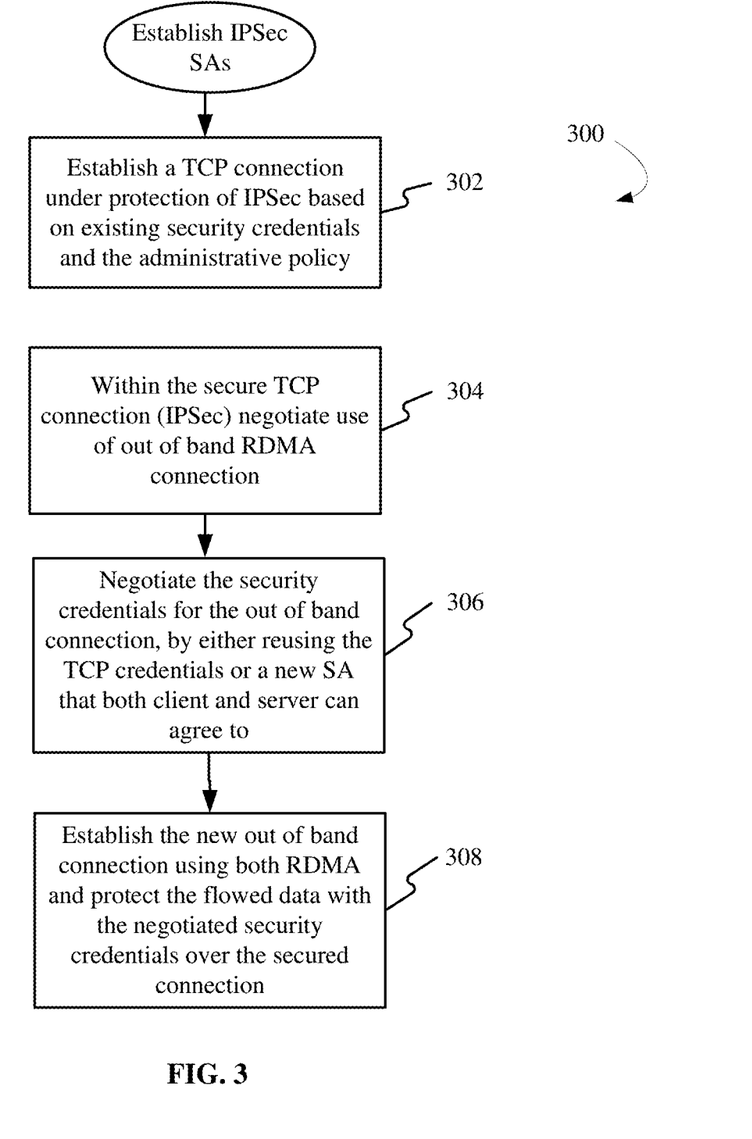
FIG. 3 depicts a method for establishing a secure connection according to embodiments of the present invention.

FIG. 3 depicts one or more embodiments of the present invention in greater detail. Referring now to FIG. 3, a computer-implemented method 300 for establishing a secure connection is described. As shown in block 302, processor 601 initiates a TCP connection 134 with a client device 104. If the IPSec SAs 206 and 208 do not already exist, initiating the TCP connection between the host device 102 and the client device 104 causes the IPSec SAs 206 and 208 to be created via a processor 601 over the host device network adapter 118. Accordingly, once the SAs are in place, a TCP handshake is made between the host device 102 and the client device. The handshake is protected by the IPSec SAs 206 and 208. Next, Connection Layer Control (CLC) messages 133 are exchanged over the TCP connection using adapter 118 to negotiate the shared memory communications over remote direct memory access (SMC-R) with the client device 104. Once the CLC exchange completes successfully (and if there is not already a suitable queue pair available between the two endpoints), then a connection between the RoCE adapters is established over a new Reliably Connected Queue Pair (RC-QP, or "QP"). It is this queue pair over which the application data will flow.

After establishing the TCP connection and negotiating, at block 304 processor 601 forwards the IPSec SAs 206b and related keys from the IPSec component of TCP/IP stack 207 (collectively 113) to RoCE adapter 114 on host device 102.

In one aspect, the processor on RoCE adapter 114 establishes a queue pair (QP) with the RoCE adapter 115 on client device 104 after the negotiation, where the QP is based on the RDMA credentials negotiated in the CLC exchange. Accordingly, RoCE establishes its own new user datagram protocol (UDP) port in its own TCP/IP stack. This UDP port is connected to the new QP and allows the RoCE adapter to transmit and receive UDP encapsulated messages over the QP. With the QP in place, RoCE determines a connection rule for a new UDP port. The connection rule is based on a cryptographic encryption level. More specifically, the connection rule may be based on the SAs that were forwarded by the host device.

In some embodiments of the present invention, the connection rule determines whether the established queue pair (QP) has a highest available cryptographic protection, and the processor requests the QP having the highest available cryptographic protection by default. In other aspects, RoCE adapter 114 determines whether all data traffic that will flow on the RoCE adapter will require cryptographic protection.

According to some embodiments, it may be possible to have multiple levels of security—i.e., strongest security available, medium strength, and no protection at all. According to one embodiment, each security level has its own QP and SAs. Responsive to determining that less than all data traffic that will flow on RoCE adapter 114 will require cryptographic protection, a new connection proposal message is forwarded to RoCE adapter 115 on the client device 104 requesting two sets of QPs: a first QP having no cryptographic protection, and a second QP having the highest available cryptographic protection, and in some embodiments, a third QP having an intermediate level of cryptograph protection. Accordingly, the processor on the RoCE adapter 114 establishes a first QP and a second QP, where the first QP has the highest available cryptographic protection and the second QP has no cryptographic protection. The third QP may be established as needed.

In some aspects, processor 601 may determine that less than all data traffic that will flow on the new UDP port will require cryptographic encryption. For example, there may be sufficient data traffic that consists of general (non-secured) internet traffic or other data flows. It is beneficial, then, to conserve computing resources and data transmission bandwidth resources that may be unnecessarily consumed by over-protecting data flows. In such cases, processor 601 may establish the QP having no cryptographic protection or an intermediate level of cryptographic protection.

In one aspect, it may be beneficial to create two or more levels of security for the data flows. Processor 601 may write the connection rule that requests the first predetermined QP having the highest available cryptographic protection pair for a new connection. The connection rule also requests the second predetermined SA pair having no cryptographic protection for a second new connection. Accordingly, processor 601 establishes the first new connection for IPSec traffic and establishes the second new connection for non-IPSec traffic. In this way, resources needed for encryption are not expended on the second connection data flows having non-critical information (that do not need IPSec security). Accordingly, the new port is established using credentials (SAs 206) appropriated from the initial IKE connection process.

In other embodiments, it may be beneficial to create a third level of security for the data flows with an encryption level that is more than no encryption, and yet does not need the protection of the highest level of cryptographic protection available, which are more constraining on system resources. Accordingly, processor 601 may write a connection rule that requests the third predetermined QP.

In some aspects of the present invention, a cloud computing model may be used in one or more embodiments. A discussion on cloud computing is provided as background for such embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model:

On-demand self-service: a cloud consumer can unilaterally provision computing capabilities, such as server time and network storage, as needed automatically without requiring human interaction with the service's provider.

Figure 6:
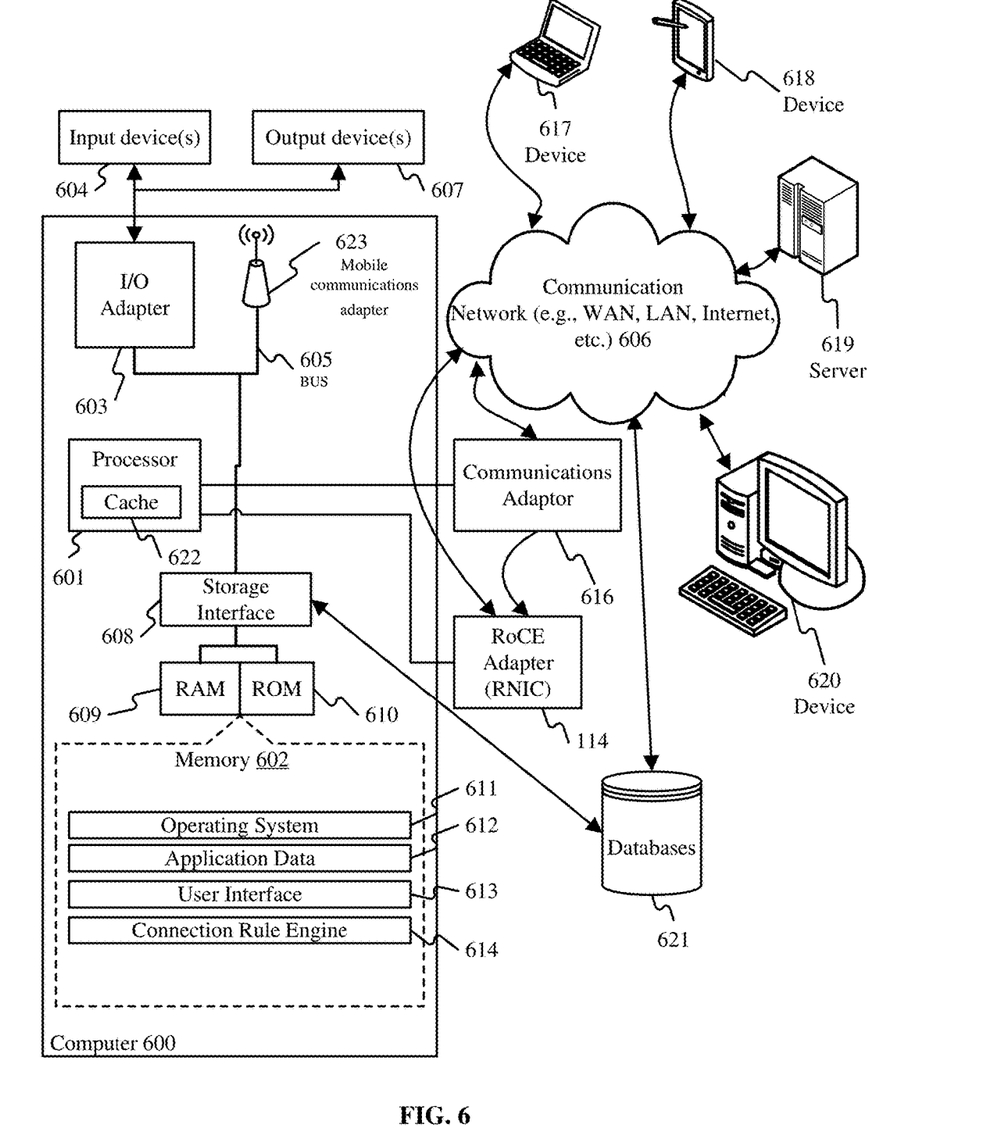
FIG. 6 depicts a block diagram of a computer system and environment, according to one embodiment of the present invention.

Broad network access: capabilities are available over a network (e.g., network 606, as depicted in FIG. 6) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 606, as depicted in FIG. 6), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 606, as depicted in FIG. 6), servers, operating systems, or storage, but has control over the deployed applications and possibly application hosting environment configurations.

Infrastructure as a Service (IaaS): the capability provided to the consumer is to provision processing, storage, networks (e.g., network 606, as depicted in FIG. 6), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSs) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 4:
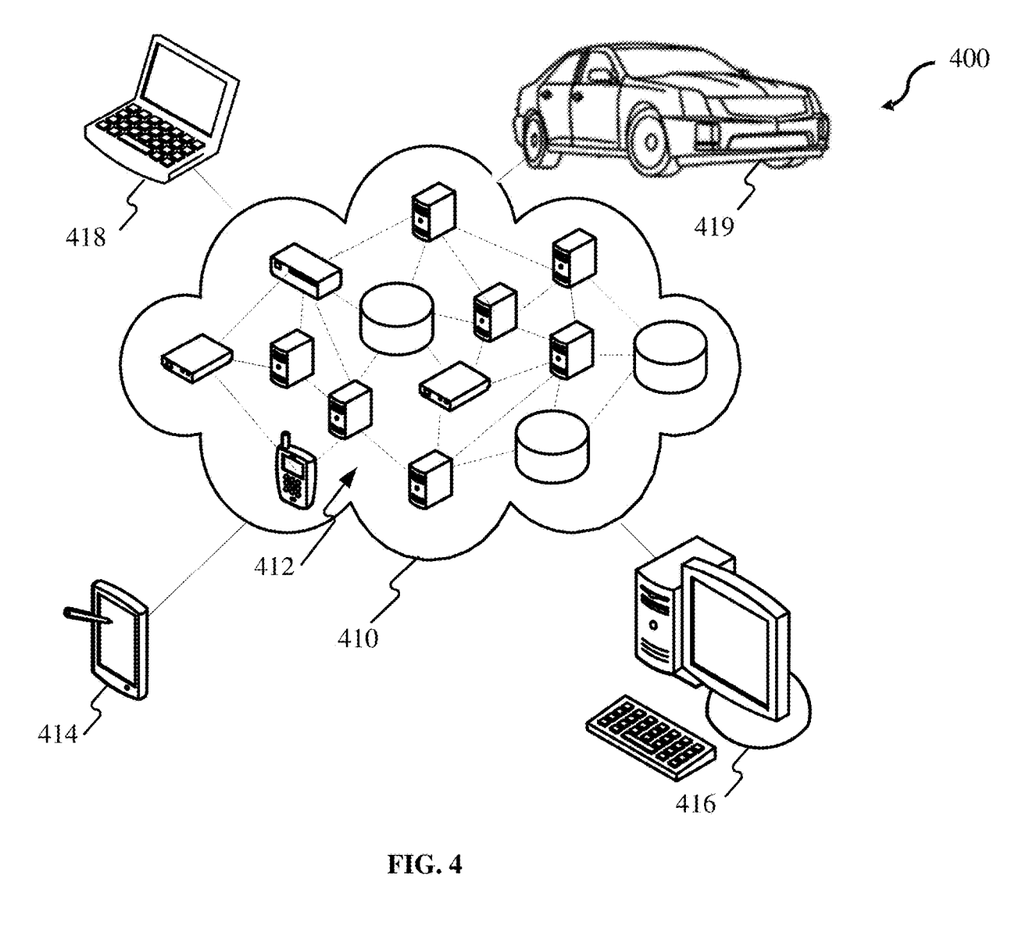
FIG. 4 depicts a cloud computing environment, according to one embodiment of the present invention.

Referring now to FIG. 4, a cloud computing environment 400 for use in practicing the teachings herein is depicted. As shown in FIG. 4, cloud computing environment 400 comprises one or more cloud computing nodes 412 with which local computing devices used by cloud consumers, such as, for example, a computing device 414, a desktop computer 416, a laptop computer 418, and/or an automobile computer system 419 can communicate. Cloud computing nodes 412 can communicate with one another. They can be grouped (not shown) physically or virtually, in one or more networks 410, such as a Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 414-419 shown in FIG. 4 are intended to be illustrative only and that cloud computing nodes 412 and cloud computing environment 400 can communicate with any type of computerized device over any type of network and/or network addressable connection (e.g., using a web browser).

Figure 5:
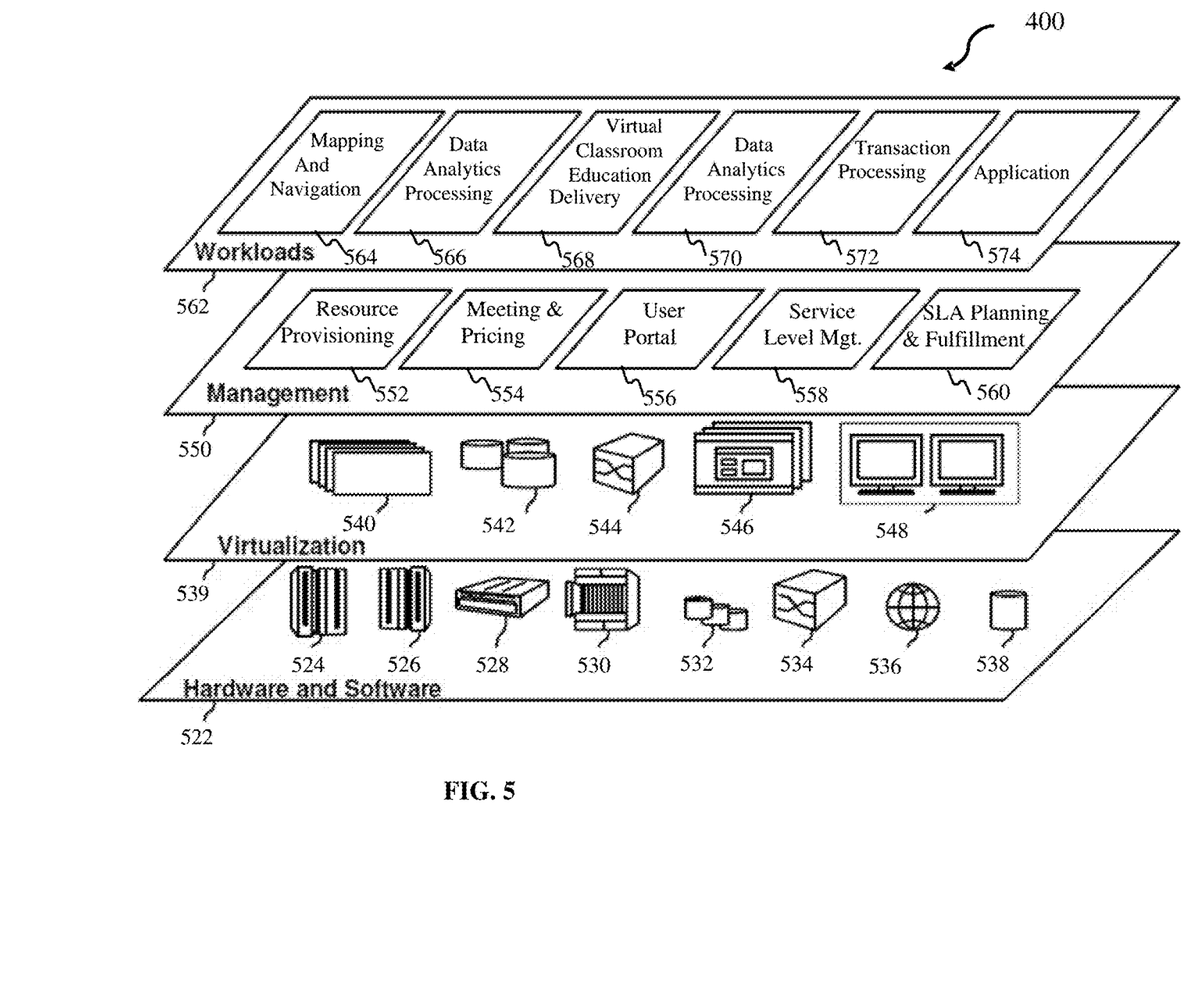
FIG. 5 depicts abstraction model layers, according to one embodiment of the present invention.

Referring now to FIG. 5, a set of functional abstraction layers 520 provided by cloud computing environment 400 (as depicted in FIG. 4) is shown. It should be appreciated that the components, layers, and functions of functional abstraction layers 520 depicted in FIG. 5 are illustrative only, and embodiments of the invention are not limited thereto. As depicted, the following layers and corresponding functions are provided:

A hardware and software layer 522 can include hardware and software components. Examples of hardware components can include, for example, mainframes 524, RISC (Reduced Instruction Set Computer) architecture based servers 526, servers 528, blade servers 530, storage devices 532, and networks and networking components 534. In some embodiments, software components include network application server software 536 and database software 538.

A virtualization layer 539 can provide an abstraction layer from which the following examples of virtual entities can be provided: virtual servers 540, virtual storage 542, virtual networks 544, which can include virtual private networks, virtual applications and operating systems 546, and virtual clients 548.

In one example, a management layer 550 can provide the functions described below. A resource provisioning module 552 can provide dynamic procurement of computing resources and other resources that can be utilized to perform tasks within the cloud computing environment. A metering and pricing resource 554 can provide cost tracking as resources are utilized within the cloud computing environment, and billing or invoicing for consumption of these resources. In one example, metering and pricing resources can include application software licenses. A user portal 556 can provide access to cloud computing environment 400 for consumers and system administrators (not shown). In some embodiments, user portal 556 can provide security and/or identity verification for cloud consumers (e.g., one or more consumers operating one or more of computing devices 414-419) and tasks, as well as protection for data and other resources. A service level management resource 558 can provide cloud computing resource allocation and management such that required service levels are met. A service level agreement (SLA) planning and fulfillment resource 560 can provide pre-arrangement for, and procurement of cloud computing resources for which a future requirement is anticipated in accordance with an SLA.

A workloads layer 562 can provide functionality for which the cloud computing environment can be utilized. For example, workloads layer 562 can include a mapping and navigation resource 564, a software development and lifecycle management resource 566, a virtual classroom education delivery resource 568, a data analytics processing resource 570, a transaction processing resource 572, and connection rule resource 574.

FIG. 6 illustrates a block diagram of an exemplary computing environment and computer system 600 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 600 therefore can embody a general-purpose computer. In another exemplary embodiment, the implementation can be part of a mobile device, such as, for example, a mobile phone, a personal data assistant (PDA), a tablet computer, etc.

As shown in FIG. 6, the computer 600 includes processor 601. Computer 600 also includes memory 602 communicatively coupled to processor 601, and one or more input/output adapters 603 that can be communicatively coupled via system bus 605. Memory 602 can be communicatively coupled to one or more internal or external memory devices via a storage interface 608.

Communications adapter 616 can communicatively connect computer 600 to one or more networks 606. According to one exemplary embodiment, communications adapter 616 is a separate appliance from RoCE adapter 114.

System bus 605 can communicatively connect one or more user interfaces via input/output (I/O) adapter 603. I/O adapter 603 can connect a plurality of input devices 604 to computer 600. Input devices can include, for example, a keyboard, a mouse, a microphone, a sensor, etc. System bus 605 can also communicatively connect one or more output devices 607 via I/O adapter 603. Output device 607 can include, for example, a display, a speaker, a touchscreen, etc.

Processor 601 is a hardware device for executing program instructions (aka software), stored in a computer-readable memory (e.g., memory 602). Processor 601 can be any custom made or commercially available processor, a central processing unit (CPU), a plurality of CPUs, for example, CPU 601a-601c, an auxiliary processor among several other processors associated with the computer 600, a semiconductor based microprocessor (in the form of a microchip or chip set), or generally any device for executing instructions. Processor 601 can include a cache memory 622, which can include, but is not limited to, an instruction cache to speed up executable instruction fetch, a data cache to speed up data fetch and store, and a Translation Lookaside Buffer (TLB) used to speed up virtual-to-physical address translation for both executable instructions and data. Cache memory 622 can be organized as a hierarchy of more cache levels (L1, L2, etc.).

Processor 601 can be disposed in communication with one or more memory devices (e.g., random access memory (RAM) 609, read only memory (ROM) 610, one or more external databases 621, etc.) via a storage interface 608. Storage interface 608 can also connect to one or more memory devices including, without limitation, one or more databases 621, and/or one or more other memory drives (not shown) including, for example, a removable disc drive, etc., employing connection protocols such as serial advanced technology attachment (SATA), integrated drive electronics (IDE), universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 602 can include random access memory (RAM) 609 and read only memory (ROM) 610. RAM 609 can be any one or combination of volatile memory elements (e.g., DRAM, SRAM, SDRAM, etc.). ROM 610 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 602 can incorporate electronic, magnetic, optical, and/or other types of non-transitory computer-readable storage media. Memory 602 can also be a distributed architecture, where various components are situated remote from one another, but can be accessed by processor 601.

The instructions in memory 602 can include one or more separate programs, each of which can include an ordered listing of computer-executable instructions for implementing logical functions. In the example of FIG. 6, the instructions in memory 602 can include an operating system 611. Operating system 611 can control the execution of other computer programs and provides scheduling, input-output control, file and data management, memory management, and communication control and related services.

The program instructions stored in memory 602 can further include application data 612, and for a user interface 613.

I/O adapter 603 can be, for example but not limited to, one or more buses or other wired or wireless connections. I/O adapter 603 can have additional elements (which are omitted for simplicity) such as controllers, microprocessors, buffers (caches), drivers, repeaters, and receivers, which can work in concert to enable communications. Further, I/O adapter 603 can facilitate address, control, and/or data connections to enable appropriate communications among the aforementioned components.

I/O adapter 603 can further include a display adapter coupled to one or more displays. I/O adapter 603 can be configured to operatively connect one or more input/output (I/O) devices 607 to computer 600. For example, I/O 603 can connect a keyboard and mouse, a touchscreen, a speaker, a haptic output device, or other output device. Output devices 607 can include but are not limited to a printer, a scanner, and/or the like. Other output devices can also be included, although not shown. Finally, the I/O devices connectable to I/O adapter 603 can further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like.

According to some embodiments, computer 600 can include a mobile communications adapter 623. Mobile communications adapter 623 can include a global position system (GPS), cellular, mobile, and/or other communications protocols for wireless communication.

In some embodiments, computer 600 can further include communications adapter 616 for coupling to a network 606.

Network 606 can be an IP-based network for communication between computer 600 and any external device. Network 606 transmits and receives data between computer 600 and devices and/or systems external to computer 600. In an exemplary embodiment, network 606 can be a managed IP network administered by a service provider. Network 606 can be a network internal to an aircraft, such as, for example, an avionics network, etc. Network 606 can be implemented in a wireless fashion, e.g., using wireless protocols and technologies, such as WiFi, WiMax, etc. Network 606 can also be a wired network, e.g., an Ethernet network, a controller area network (CAN), etc., having any wired connectivity including, e.g., an RS232 connection, R5422 connection, etc. Network 606 can also be a packet-switched network such as a local area network, wide area network, metropolitan area network, Internet network, or other similar type of network environment. The network 606 can be a fixed wireless network, a wireless local area network (LAN), a wireless wide area network (WAN) a personal area network (PAN), a virtual private network (VPN), intranet or other suitable network system.

Network 606 can operatively connect computer 600 to one or more devices including device 617, device 618, and device 620. Network 606 can also connect computer 600 to one or more servers such as, for example, server 619.

If computer 600 is a PC, workstation, laptop, tablet computer and/or the like, the instructions in the memory 602 can further include a basic input output system (BIOS) (omitted for simplicity). The BIOS is a set of routines that initialize and test hardware at startup, start operating system 611, and support the transfer of data among the operatively connected hardware devices. The BIOS is typically stored in ROM 610 so that the BIOS can be executed when computer 600 is activated. When computer 600 is in operation, processor 601 can be configured to execute instructions stored within the memory 602, to communicate data to and from the memory 602, and to generally control operations of the computer 600 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for establishing a secure connection comprising:
   establishing a Transmission Control Protocol (TCP) connection between a host device and a client device via a host device network adapter;
   forwarding, from the host device, Internet Protocol Security (IPSec) Security Associations (SAs) and related keys to a Remote Direct Memory Access over Converged Ethernet (RoCE) adapter on the host device for remote direct memory access; and
   communicating protected data via the RoCE adapter on the host device to and from the client device over an RoCE connection using the IPSec SAs and related keys.

2. The computer-implemented method of claim 1, wherein establishing the TCP connection between the host device and the client device comprises establishing the IPSec SAs via a processor on the host device, wherein a TCP handshake and a CLC exchange over the TCP connection between the host device and the client device are protected by the IPSec SAs.

3. The computer-implemented method of claim 1, wherein communicating the protected data comprises sending and receiving data via the RoCE adapter on the host device to and from a second RoCE adapter on the client device under protection of the IPSec SAs, wherein, for each respective RoCE adapter, the protected data is enforced by an IPSec component of the RoCE adapter on the host device of a TCP/IP stack on the host device using the SAs that were forwarded by the host device.

4. The computer-implemented method of claim 3, further comprising:
   negotiating Shared Memory Communications Over Remote Direct Memory Access (SMC-R) with the client device via a processor over the network adapter, wherein the negotiating is based on a TCP handshake as well as a CLC exchange that occurs over the TCP connection.

5. The computer-implemented method of claim 4, wherein after the negotiating, the RoCE adapter on the host device forwards a new connection proposal message to the client device for the SMC-R after performing the TCP handshake and CLC exchange.

6. The computer-implemented method of claim 5, further comprising:
   associating, via the processor, a queue pair (QP) through the RoCE adapter on the host device responsive to an affirmative result of the negotiating; and
   communicating the protected data via the RoCE adapter on the host device over the QP using the forwarded IPSec SAs.

7. The computer-implemented method of claim 6, wherein the QP has a highest available cryptographic protection, and the processor requests the QP having the highest available cryptographic protection by default.

8. The computer-implemented method of claim 6, further comprising:
   evaluating, via the processor, whether all data traffic that will flow on the RoCE adapter on the host device will require IPSec protection; and
   responsive to determining that less than all data traffic that will flow on the RoCE adapter on the host device will require cryptographic protection, forwarding a new connection proposal message to the client device requesting association of at least one queue pair.

9. The computer-implemented method of claim 8, further comprising:
associating one or more of a first QP, a second QP and a third QP, wherein the first QP is established for non-IPSec traffic, the second QP is established for IPSec traffic, and the third QP is established for IPSec traffic and has an intermediate level of cryptographic protection.

10. The computer-implemented method of claim 9, wherein the first QP has a highest available cryptographic protection and is established for non-IPSec traffic and the second QP is established for IPSec traffic and has no cryptographic protection.

* * * * *